United States Patent
Neumann et al.

(10) Patent No.: US 10,283,779 B2
(45) Date of Patent: May 7, 2019

(54) CATALYST SUPPORT AND METHOD FOR PRODUCING POROUS GRAPHITIZED CARBON MATERIAL COVERED WITH METAL NANOPARTICLES

(71) Applicant: Heraeus Deutschland GmbH & Co. KG, Hanau (DE)

(72) Inventors: Christian Neumann, Hungen (DE); Jörg Becker, Niddatal (DE); Sascha Pihan, Aschaffenburg (DE); Richard Walter, Alzenau (DE); Walter Laessig, Gelnhausen (DE); Florian Eweiner, Hanau (DE); Rainer Kiemel, Langenselbold (DE); Gabriele Przibilla, Hanau (DE); Christian Breuer, Darmstadt (DE); Mark Neuschütz, Mühltal (DE)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 150 days.

(21) Appl. No.: 15/317,159

(22) PCT Filed: May 27, 2015

(86) PCT No.: PCT/EP2015/061669
§ 371 (c)(1),
(2) Date: Dec. 8, 2016

(87) PCT Pub. No.: WO2015/189030
PCT Pub. Date: Dec. 17, 2015

(65) Prior Publication Data
US 2017/0141405 A1    May 18, 2017

(30) Foreign Application Priority Data
Jun. 11, 2014 (EP) .................................. 14172024

(51) Int. Cl.
*H01M 4/86* (2006.01)
*H01M 4/88* (2006.01)
(Continued)

(52) U.S. Cl.
CPC .......... *H01M 4/8605* (2013.01); *B01J 23/38* (2013.01); *B01J 23/42* (2013.01); *B01J 37/0018* (2013.01);
(Continued)

(58) Field of Classification Search
CPC . H01M 4/8605; H01M 4/8817; H01M 4/8842
See application file for complete search history.

(56) References Cited

U.S. PATENT DOCUMENTS

| 4,551,220 A | 11/1985 | Oda et al. |
| 6,780,350 B1 | 8/2004 | Kodas et al. |

(Continued)

FOREIGN PATENT DOCUMENTS

| EP | 0450849 A2 | 10/1991 |
| EP | 0676050 A1 | 10/1995 |

(Continued)

OTHER PUBLICATIONS

Office Action dated Mar. 5, 2018 in JP Application No. 2016-572581; English Translation Only.
(Continued)

*Primary Examiner* — Stewart A Fraser
(74) *Attorney, Agent, or Firm* — Panitch Schwarze Belisario & Nadel LLP

(57) ABSTRACT

A known method for producing porous graphitized carbon material covered with metal nanoparticles involves infiltrating a porous template framework of inorganic material with a carbon precursor. After thermal treatment of the precursor, the template is removed and the particulate porous carbon material is covered with a catalytically active substance.
(Continued)

According to the invention, in order to keep the proportion of the noble metal loading at a low level, the thermal treatment of the precursor first involves carbonization, and the material is not graphitized into graphitized, particulate, porous carbon material until the template has been removed. The graphitized carbon material has a hierarchical pore structure with a pore volume of at least 0.5 cm$^3$/g and at least 75% of the pore volume is apportioned to macropores with, size 100 to 5000 nm. Before covering with catalytically active substance, the carbon material is subjected to an activation treatment in an oxidizing atmosphere.

14 Claims, 4 Drawing Sheets

(51) Int. Cl.

| | |
|---|---|
| H01M 4/92 | (2006.01) |
| B01J 37/08 | (2006.01) |
| B01J 37/14 | (2006.01) |
| B01J 23/38 | (2006.01) |
| B01J 23/42 | (2006.01) |
| B01J 37/06 | (2006.01) |
| B01J 37/00 | (2006.01) |
| C01B 32/05 | (2017.01) |
| C01B 32/20 | (2017.01) |
| B01J 35/00 | (2006.01) |
| B01J 35/10 | (2006.01) |
| B01J 37/02 | (2006.01) |
| H01M 8/1018 | (2016.01) |

(52) U.S. Cl.
CPC ............. *B01J 37/06* (2013.01); *B01J 37/084* (2013.01); *B01J 37/14* (2013.01); *C01B 32/05* (2017.08); *C01B 32/20* (2017.08); *H01M 4/8817* (2013.01); *H01M 4/8842* (2013.01); *H01M 4/926* (2013.01); *B01J 35/006* (2013.01); *B01J 35/108* (2013.01); *B01J 35/1014* (2013.01); *B01J 35/1019* (2013.01); *B01J 35/1047* (2013.01); *B01J 35/1071* (2013.01); *B01J 35/1076* (2013.01); *B01J 35/1095* (2013.01); *B01J 37/0203* (2013.01); *H01M 2008/1095* (2013.01); *H01M 2250/20* (2013.01); *Y02T 90/32* (2013.01)

(56) References Cited

U.S. PATENT DOCUMENTS

| | | | |
|---|---|---|---|
| 6,967,183 | B2 | 11/2005 | Hampden-Smith et al. |
| 7,144,652 | B2 | 12/2006 | Alberti et al. |
| 7,488,699 | B2 | 2/2009 | Huang et al. |
| 7,687,187 | B2 | 3/2010 | Fukuda et al. |
| 2009/0098442 | A1 | 4/2009 | Pak et al. |
| 2009/0208780 | A1 | 8/2009 | Sun et al. |
| 2009/0269667 | A1 | 10/2009 | Antonietti et al. |
| 2012/0301387 | A1* | 11/2012 | Neumann ............... C03B 19/14 423/445 R |
| 2013/0209891 | A1 | 8/2013 | Neumann et al. |
| 2015/0050583 | A1* | 2/2015 | Schuth ................... B01J 37/084 429/524 |

FOREIGN PATENT DOCUMENTS

| | | |
|---|---|---|
| JP | 359127374 A | 7/1984 |
| JP | 106140047 A | 5/1994 |
| JP | 2006187744 A | 7/2006 |
| JP | 2009538813 A | 11/2009 |
| JP | 2011514304 A | 5/2011 |
| JP | 2013518022 A | 5/2013 |
| JP | 2015511876 A | 4/2015 |
| WO | 2013117725 A1 | 8/2013 |

OTHER PUBLICATIONS

Int'l Preliminary Report on Patentability dated Dec. 15, 2016 in Int'l Application No. PCT/EP2015/061669.
Int'l Search Report dated Jul. 20, 2015 in Int'l Application No. PCT/EP2015/061669.
Search Report dated Sep. 5, 2014 in EP Application No. 14172024.3.
Nesselberger et al., "The Effect of Particle Proximity on the Oxygen Reduction Rate of Size-Selected Platinum Clusters", Nature Materials, vol. 12, pp. 919-924 (Oct. 2013).

* cited by examiner

CATALYST SUPPORT AND METHOD FOR PRODUCING POROUS GRAPHITIZED CARBON MATERIAL COVERED WITH METAL NANOPARTICLES

CROSS-REFERENCE TO RELATED APPLICATIONS

This application is a Section 371 of International Application No. PCT/EP2015/061669, filed May 27, 2015, which was published in the German language on Dec. 17, 2015 under International Publication No. WO 20151189030 A1 and the disclosure of which is incorporated herein by reference.

BACKGROUND OF THE INVENTION

Technical Field

In catalyst supports a catalytically active material is applied in highly dispersed form to the surface of an electrically conductive support material. They are used in many different technical fields, for instance in exhaust gas cleaning, energy generation or in chemical engineering for the synthesis or modification of substances; in particular, they are also used in fuel cells and other electrochemical elements and electrochemical energy converters.

Fuel cells are milvanic cells in which the chemical reaction energy from the reaction of a fuel and an oxidizing agent is galvanically converted into electrical energy. The best-known example is the hydrogen/oxygen fuel cell.

The so-called PEM fuel cell (Polymer Electrolyte Membrane) is preferred because of its high energy density and robustness for mobile use for the electrotraction of automotive vehicles. It consists of a stack-like assembly of membrane electrode units MEA (Membrane Electrode Assembly) between which bipolar plates are arranged for gas supply and current removal.

An MEA consists of a solid, proton-conducting membrane (polymer electrolyte or ionomer membrane) which is provided at both sides with catalyst-containing reaction layers. Proton-conducting polymer materials are also called "ionomers." Tetrafluoroethylene-fluoro-vinyl ether copolymers with sulfonic acid groups, which are for instance available under the trade name Nafion® of the company DuPont, are in common use.

In the hydrogen/oxygen fuel cell one of the reaction layers of the MEA serves as an anode for the oxidation of hydrogen to form protons, and the other serves as a cathode for the reduction of oxygen to form water.

Anodes and cathodes contain active components for the catalytic support of the respective reaction, preferably metals and noble metal alloys of the platinum group which are deposited as fine noble-metal particles on a support, preferably of porous graphitized carbon.

So-called gas distributor structures or gas diffusion layers of carbon fiber paper, carbon fiber fabric or carbon nonwoven, which ensure easy access of the reaction gases to the electrodes and the removal of the cell current, are applied to these reaction layers.

Prior Art

The high temperatures and electrical voltages arising during use may cause corrosion (oxidation) of the support and thus an activity loss. This is particularly true for the oxygen electrode (cathode) of the hydrogen/oxygen fuel cell, the instability of which significantly limits the long-term use of such fuel cells. To improve corrosion stability, it is recommended in U.S. Pat. No. 4,551,220 A that the specific surface of the support of carbon should be reduced by at least partial graphitization of up to 20%. It is explained in U.S. Pat. No. 7,587,187 B2 in this respect that an even higher graphitization degree leads to further stabilization of the carbon support. A "high graphitization degree" is here defined by a basal plane spacing d002 of less than 0.338 nm. Such a high graphitization degree, however, is not achievable with every carbon start material, not even by heating to maximum temperatures of about 2,800° C.

With respect to high efficiency of the catalyst, the so-called electro chemical area (ECA) of the composite material should be as large as possible despite a small specific surface area of the carbon support. In this respect, EP 0 450 849 B1 teaches the deposition of a platinum alloy of basic solution on a conductive carbon support composed of "carbon blacks" or "acetylene blacks." Cr, Mn, Co or Ni with a proportion between 35-65% is suggested as an alloying partner for platinum. After a reducing heat treatment, the composite material shows an ECA of more than 40 $m^2/g$.

The support material which is known from U.S. Pat. No. 6,967,183 B2 and composed of graphitic carbon consists of particles with a mean size in the range between 10-100 nm. It is covered with platinum particles with a diameter of not more than 20 nm. The electrocatalytic powder has a specific surface area of at least 90 $m^2/g$.

In principle, the catalytic activity and the achievable cell voltages can be increased by homogeneous dispersion of platinum nanoparticles with interparticle distances as small as possible of less than the Debye length of the EDL (Electrical Double Layer) (*Nature Materials*, Vol. 12, p. 919, October 2013,).

EP 0 676 050 B1 suggests a support catalyst in which dye needle crystals (perylehe-red nanowhiskers) with structure sizes of up to 50 nm are used as the support material and are covered with nanoscale catalyst particles composed of platinum. At high current densities these support particles show excellent characteristics, but are subject to severe degradation under partial load due to the evolving water products that primarily close the small pores by condensation and swelling of the polymeric ionomer and thus significantly reduce the active surface of the catalyst support.

To reduce this effect, an attempt is made to change the hydrophility of the surfaces by adding hydrophilic components (U.S. Pat. No. 7,144,652 B2) or to produce a catalyst layer with spatially inhomogeneous properties by adding carbon additives (U.S. Pat. No. 7,687,187 B2).

Other known methods for producing electrocaralytic carbon powder with defined microstructure and morphology are based on template routes. In the catalyst known from U.S. Pat. No. 7,488,699 B1 for methanol/fuel cells, the support is fabricated from mesoporous carbon in a template method in which the template material consists of quartz glass produced by a sol-gel method. For the preparation of the carbon powder, a dissolved carbon precursor material is introduced into the template and dried; the intermediate product obtained is ground into powder and carbonized at 900° C. The quartz-glass template is removed with HF.

To produce the catalyst, the carbon powder produced in this way is treated with an aqueous solution of Ru(NO)(NO$_3$)$_3$ and dried. Platinum is mentioned as an alternative catalytic material.

A method of the above-mentioned type is known from WO 2013/117725 A1. Mesoporous graphitized particles with hollow sphere structure are used for producing a catalyst support for electrochemical applications. The hollow spheres have a mesoporous graphitic shell which has a thickness between 20 nm and 50 nm. They are covered with a catalytically active material.

The graphitized particles are produced by a template method. The $SiO_2$ template is produced by wet-chemical conversion of a hydrolyzable silicon compound in the presence of a foaming agent, preferably an organic silicon compound, such as alkylsilane. The foaming agent releases gases during subsequent calcination and thereby produces desired nanopores in the template material.

The mesoporous $SiO_2$ template framework obtained thereby is treated with a solution of a ferrous metal salt which serves as graphitization catalyst. After removal of the solvent, the remaining pore space is impregnated with a graphitizable organic compound, preferably in solution with a radically polymerizable hydrocarbon monomer such as divinylbenzene or mesophase pitch. The composite particles obtained thereby are subjected to a high-temperature graphitization step at more than 1,000° C. Ferrous metal particles on which graphitic domains deposit are thereby formed, resulting in a graphitic framework within the porous $SiO_2$ template framework.

The template material and the ferrous metal are subsequently removed so that a mesoporous graphitic framework is obtained in the form of hollow particles of carbon (so-called HGS particles; hollow graphitic spheres). These porous hollow particles of carbon have a diameter in the range of 60-440 nm with wall thicknesses between 20 nm and 50 nm and they show a bimodal pore size distribution with a pronounced maximum in the range of 2 nm to 6 nm and a smaller maximum in the range of 6 nm to 20 nm; their BET surface area is in the range of 1,200 to 1,500 m²/g.

They are impregnated with a preferably alcoholic solution of a catalytically active compound of a noble metal, such as platinum, rhodium, palladium, ruthenium or mixtures thereof, and subjected to a hydrogenation step (annealing in a hydrogen atmosphere at 200-400° C.), so that sinter-stable noble-metal nanoparticles in the size range of about 3 nm precipitate on the surfaces of the hollow particles of carbon. Metal loading is typically 20% by wt., based on the total weight of the metal-loaded hollow particles of carbon. For the purpose of enhancing temperature stability, calcination is subsequently intended at 600-1,000° C.

Graphitization in the presence of the oxide-containing template material $SiO_2$ requires a comparatively low graphitization temperature because, otherwise, the carbon may burn off and SiC may form, which could destroy the thin walls of the hollow particles of carbon. The comparatively low graphitization temperature helps the porous hollow particles of carbon to have a large specific surface area (BET) which allows high loadability with catalytically active substance and thus a high capacity. On the other hand, a low graphitization temperature is at the expense of the graphitization degree, which has an adverse effect on corrosion resistance, particularly with respect to the oxygen reduction reaction of a fuel cell.

Technical Objective

The design of a catalyst support which is corrosion-stable and efficient at the same time, particularly for PEM fuel cells, presents a great challenge. The following requirements must here be met:

1. To achieve a catalytic efficiency as high as possible—catalytic activity as high as possible, with minimal noble-metal use, the catalytically active noble metal should provide a great active surface and therefore be deposited as homogeneously as possible and with fine particles, without agglomerates being formed on the catalyst support. At the same time, however, it should also be fixed to the support material to be as electrolyte-resistant as possible.
2. The pore structure of the catalyst support is to allow an efficient transport of the components involved in the respective reaction, such as protons and oxygen in the fuel cell, to the catalyst layers and to effectively discharge the reaction products, such as water.

When all of these conditions are met, it is possible to keep the share of the noble metal loading at a low level required for commercial products of less than about 0.2 mg/cm². None of the known catalyst supports fulfills all of the requirements at the same time. Hence, it is the object of the invention to provide a catalyst support which satisfies the above-mentioned conditions.

Furthermore, it is the object of the present invention to provide a method which allows the production of such a catalyst support.

BRIEF SUMMARY OF THE INVENTION

The present invention relates to a method for producing a porous graphitized carbon material covered with metal nanoparticles, particularly for electrochemical applications, comprising the following method steps:
(a) providing a porous template framework composed of inorganic template material,
(b) infiltrating the porous template framework with a carbon precursor,
(c) thermal treatment of the carbon precursor,
(d) removing the template framework to form particulate porous carbon material, and
(e) covering the particulate porous carbon material with a catalytically active substance.

Moreover, the present invention relates to a catalyst support containing an electrically conductive porous support of porous graphitized carbon material covered with a catalytically active substance.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
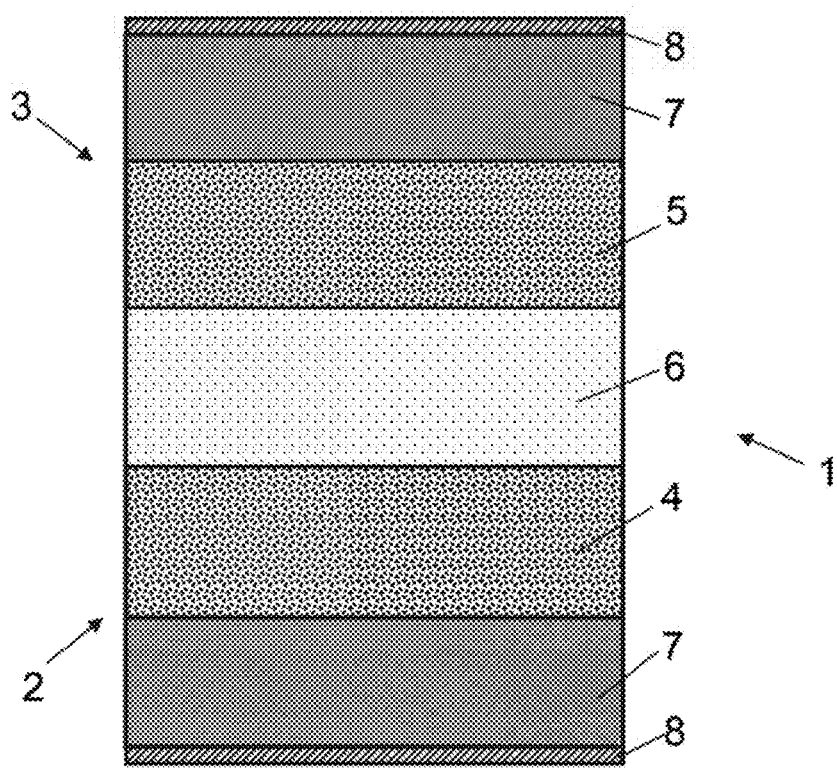
FIG. 1 shows a hydrogen/oxygen fuel cell in a longitudinal section through a honeycomb of the fuel cell in a schematic illustration.

As for the method, this object starting from a method of the aforementioned type is achieved according to the invention in that the thermal treatment of the carbon precursor in method step (c) comprises carbonization of the carbon precursor at a carbonization temperature, that the particulate porous carbon material is graphitized at a graphitization temperature higher than the carbonization temperature to form a graphitized, particulate, porous carbon material, that the graphitized carbon material is subjected to an activation treatment in an atmosphere having an oxidizing effect, wherein the graphitized carbon material has a hierarchical pore structure with a pore volume of at least 0.5 cm$^3$/g, wherein at least 75% of the pore volume is apportioned to macropores in the size range of 100 to 5,000 nm.

The method according to the invention serves the production of porous carbon material which is covered with catalytically active substance. The catalyst support obtained according to the method is suited for use in many different technical fields, as has been explained above. The method according to the invention will be explained hereinafter mainly with respect and reference to an example of an electrochemical application of the catalyst support and here particularly for the use as an electrode material in a fuel cell, but without the invention being thereby restricted to that use.

The crystal structure of graphite is distinguished by superposed parallel layers (graphite layers or basal planes) in which carbon atoms are respectively arranged in a hexagonal structure. In disordered carbon modifications, deviations are found in the parallel arrangement of the graphite layers and/or in the ideally hexagonal structure. By annealing at a high temperature under oxygen exclusion, the proportion of the ideally hexagonal crystal structure can be increased. This annealing process is called "graphitization."

In the generic method, carbonization and graphitization of the carbon precursor take place within one and the same thermal treatment (method step (c)). The carbon precursor is subjected to the graphitization temperature, the highest temperature in the manufacturing process, and is thereby converted into carbon and is simultaneously given the ideally hexagonal, graphitic structure. It is only after this thermal treatment that the template framework is removed.

By contrast, in the method according to the invention, carbonization of the carbon precursor and subsequent graphitization are separate method steps, wherein the template framework is removed between the two treatment stages. The treatment temperature during carbonization is lower than during graphitization. The template material is removed between the high-temperature steps. Since the template framework is removed prior to graphitization, a chemical reaction of the material of the template framework with the carbon having a strongly reducing action at the high graphitization temperature is avoided also at a high graphitization temperature. It is thereby ensured that a high graphitization degree can be set.

During carbonization, the carbon precursor is carbonized at a carbonization temperature under oxygen exclusion. The result of the carbonization process is a porous carbon material which is deposited on the template framework.

The template framework is removed, for instance by chemical dissolution. Due to the removal, the volume which was previously occupied by template material becomes free and thereafter represents in the porous carbon material additional cavities that are three-dimensionally interlinked. These cavities shall also be called "extemplate pores" in the following and typically have sizes in the macropore range.

The porous carbon material which remains after removal thereby comprises the originally existing pores and the additional extemplate pores.

Pore sizes, defined as the distance of opposite pore walls, in the nanometer range are generally subdivided into three categories; micropores (<2 nm), mesopores (2-50 nm) and macropores (>50 nm).

Due to previous manufacturing steps, the particulate carbon material obtained after carbonization may already have a particle size that is adapted to the specific use thereof, e.g., to the use as an electrode material for a fuel cell. Otherwise, the particle size is set accordingly prior to the graphitization of the carbon material. The carbon material is comminuted, preferably by grinding, and preferably into particles with a particle size of less than 20 μm, particularly preferably to less than 10 μm. This setting of the particle size can be carried out prior to or after removal of the template framework.

The small mean particle size of less than 20 μm, preferably less than 10 μm, turns out to be particularly advantageous for the production of very thin catalyst layers.

For graphitization, the particulate porous carbon material which is free of template material is heated to the graphitization temperature. During graphitization micropores disappear, mesopores rearrange, whereas macropores change little. The result of this process is graphitized, particulate, porous carbon material with a high share of three-dimensionally interlinked macropores. These contribute to the absorption capacity for the catalytically active substance and to the improvement of the accessibility by the electrolyte for good proton transport to the homogeneously dispersed, catalytically active nanoparticles, so that protons and oxygen can efficiently be transported to the catalyst layers and the evolving water can efficiently be discharged.

It consists of polycrystalline carbon with a high graphitization degree. The high graphitization degree is defined by a spacing d002 of the graphite basal planes of less than 0.338 nm (corresponds to 338 pm). This spacing is radiographically determined with the help of the diffraction line of the (002) plane of the graphitized carbon material. A small spacing is equivalent to a high graphitization degree and contributes to a high corrosion resistance of the carbon material, particularly in the use of the carbon material as the electrode of a fuel cell at the side of the oxygen reduction reaction.

In the literature, too, the basal plane spacing d002 (the spacing of directly neighboring hexagonal planes in the direction of the crystallographic c-axis) is regarded as a relevant parameter for the graphitization degree. The following calculation formula is suggested for a qualitative indication of the graphitization degree g:

$$g=(344\ pm-d002)/(344\ pm-335.4\ pm) \qquad (1)$$

Indication of the basal plane spacing d002 in pm (picometer), the value "334 pm" corresponds to half the c-plane spacing of completely ungraphitized material, and the value "335.4 pm" to half the opiate spacing of highly ordered graphite.

A graphitization degree of 69.67% follows from calculation formula (1) for the basal plane spacing d002 of 338 pm.

Due to thin walls and the porosity of the particulate carbon start material, a comparatively low graphitization temperature which is preferably in the range of up to 1,400-2,500° C. and, particularly preferably, in the temperature range of 2,300-2,500° C., is enough in the method according to the invention for the generation of the high graphitization degree.

The graphite-like layer structure shows a comparatively high electrical conductivity and a high corrosion resistance. This may perhaps be due to the fact that, as a consequence of the facilitated graphitization, the ends of the basal planes vitrify in a way similar to glassy carbon and are thereby closed in part.

The porous graphitized carbon material consists of polycrystalline carbon, i.e., carbon comprising crystallites or graphite domains. The grain boundaries represent disturbed and therefore reactive zones by comparison with undisturbed zones.

Therefore, the graphitized particulate porous carbon material is subsequently subjected to an activation treatment in an atmosphere having an oxidizing effect, preferably at an elevated temperature between 400° C. and 500° C. and in an oxygen-containing atmosphere, e.g. in air. The graphitized carbon material is thereby structure-selectively activated on the grain boundaries, wherein reactive surface groups on which catalyst or catalyst precursors of the subsequent covering preferably deposit and get enriched are predominantly formed on the crystallite grain boundaries.

The large active surface formed thereby helps so that catalytically active substance can be deposited as homogeneously as possible and with fine particles and without the formation of agglomerates on the catalyst support and can be fixed to the support material.

The graphitized particulate porous carbon material obtained thereafter shows a hierarchical pore structure with a pore volume of at least 0.5 $cm^3/g$, wherein at least 75% of the pore volume is apportioned to macropores in the size range of 100-5,000 nm.

The hierarchical porosity of the carbon material manifests itself in that the removed template material has left cavities in the mesopore and macropore range that are three-dimensionally interlinked. The carbon deposit surrounding this cross-linked cavity consists predominantly of graphitized carbon of low porosity, the pore space of which is connected to the cavities in the mesopore and macropore range and is accessible therefrom. The hierarchical porosity is thus distinguished in that extemplate pores represent a three-dimensional cavity structure for the transport of substances to and from the pores of the graphitized carbon of low porosity.

The high share of relatively large macropores in the carbon material contributes to the absorption capacity for the catalytically active substance and to the improvement of the accessibility by the electrolyte for good proton transport to the homogeneously dispersed, catalytically active nanoparticles, so that protons and oxygen can be efficiently transported to the catalyst layers and the evolving water can be efficiently discharged.

Providing the template structure in method step (a) preferably comprises a measure which porous particles composed of the inorganic template material are produced from a start material by flame hydrolysis or pyrolysis and these are deposited from the gas phase to form the template framework.

Synthetic quartz glass, tin oxide, titanium oxide, titanium nitride and other synthetic materials are produced on an industrial scale by such plasma or CVD soot deposition methods, which are e.g., known under the names OVD or VAD methods.

Synthetic $SiO_2$ is producible at relatively low costs on an industrial scale by soot deposition methods using inexpensive start substances. The $SiO_2$ template withstands high temperatures during carbonization and is chemically inert up to at least 1,000° C. For the qualification of the deposited template material for producing a template, the template material is deposited on the deposition surface, which is, for instance a vessel, a mandrel, a plate or a filter, as a porous "$SiO_2$ soot" (here also called "soot"). This is ensured in that the temperature of the deposition surface is kept so low that a dense sintering of the deposited template material is prevented. As a rule, a thermally consolidated, but porous, "soot body" is obtained as the intermediate product. It turns out to be particularly advantageous in the soot bodies obtained thereby that these have an anisotropic mass distribution with a hierarchical pore structure due to the manufacturing process. In the soot deposition process, the template material may also be obtained in the form of soot powder which is subsequently further processed by way of granulation, press, slurry or sinter methods into the template particles. Granules or flakes could be mentioned as intermediate products. The layer of the template material which is produced by soot deposition can be comminuted with little effort, whereby template particles with a platelet-like or flake-like morphology are obtained.

In method step (b), the pores of the template framework are infiltrated with the carbon precursor. Depending on the type of the carbon precursor, it forms a more or less pore-containing carbon during carbonization, so that an intermediate product is obtained in which pores of the template material are filled at least in part with fine-pore carbon.

The intermediate product obtained thereby is comminuted into the particulate porous carbon material, and the template material is removed.

The carbon particles which are subsequently subjected to graphitization exhibit a "spongy structure" of a filigree carbon framework with thin brittle walls that substantially do not exceed a mean wall thickness in the range of 500 nm. The volume of the carbon particles is largely or even predominantly formed by macropores that are fluidically interconnected. They have an open porosity and are penetrated in the manner of a network and in three dimensions by pores and pore channels, so that the pore space ends at countless sites in an open form on the particle surface.

This structure is graphitizable almost completely without any significant change in porosity. The pore distribution of the existing, three-dimensionally interlinked macropores changes little due to the stable walls and the "spongy structure." In comparison with micropores or mesopores, macropores show a lower degree of geometric effects impeding ion mobility. The micropores mainly disappear during graphitization.

The carbon structure obtained after graphitization shows hierarchical porosity and allows good accessibility of the electrolyte together with a corrosion resistance higher than in the prior art.

During use of the carbon material produced thereby as an electrode material, the extemplate pores, which are three-dimensionally interlinked via relatively narrow channels, provide a large pore volume that is suited for receiving and fixing electrolytic active material.

High-molecular carbon-rich compounds are used as the carbon precursor; pitch, sugar, starch, polyvinyl alcohol and phenolic resin have turned out to be particularly useful.

Thin deposited layers and a crystallite morphology with many grain boundaries are here desired, such as for instance an acicular morphology, which are conducive to a "string of beads effect," which will be explained in more detail further below, in the attachment of the catalytically active substance. For a corrosion resistance of the carbon material that is as high as possible, aromatic carbon precursors, such as pitches, are used preferably by comparison with aliphatic carbon precursors.

In this connection, it has turned out to be useful when the graphitized, particulate, porous carbon material contains crystallites with acicular morphology and has dimensions of at least 20 nm, preferably at least 50 nm, and very particularly preferably at least 70 nm.

The crystallite size is here determined on the basis of an X-ray diffractogram from the measured broadening of X-ray reflections according to the so-called Scherrer equation. According to the above-explained basal plane spacing, the crystallite size is a measure of the degree of graphitization. Large crystallites are obtained due to a high degree of graphitization.

The acicular morphology can be detected under the electron microscope.

Despite the high graphitization degree, a high specific surface area (BET) of the graphitized, particulate porous carbon material is preferably set. This surface area is advantageously in the range of 5 $m^2/g$ to 200 $m^2/g$.

Preferably, a noble metal selected from the platinum group, preferably platinum, or an alloy of the noble metal is used as the catalytically active substance.

When the carbon material is used as the electrode of an oxygen/hydrogen fuel cell, water is ideally exclusively formed in the catalysis of the oxygen reduction reaction, but not the corrosively acting hydrogen peroxide ($H_2O_2$). The generation of $H_2O_2$ is efficiently suppressed by use of catalyst metal from the platinum group. The platinum group comprises the following noble metals: Ru, Rh, Pd, Os, Ir, Pt. These are present in a pure form or as an alloy among one another or with one or plural other metals, particularly with Ti, V, Cr, Mn, Fe, Co, Ni, Cu, Zn, Al, Mo, Se, Sn, W, Nb, Ta, Pb, Bi, Au, Ag, Sc, Y.

It has turned out to be useful when the covering with catalytically active substance in method step (e) comprises a measure in which a solution of a noble metal compound is applied to the carbon material and is subjected to a decomposition treatment to form a deposit of catalytically active particles on the porous carbon material.

The noble metal compound forms a precursor for the catalytically active material as such.

For a homogenous infiltration of the pore space of the carbon material, so-called precursor compounds (precursors) are normally used for loading. These are salts or complexes of the catalytically active metals that are soluble in solvent. Since the catalytically active material is provided in a solution, it is deposited homogeneously and in fine particles without the formation of agglomerates on the catalyst support, which contributes to a high catalytic efficiency. To improve the local distribution of the precursor substance in the pores of the carbon material, microwave or ultrasound energy can supportively be used.

During or after loading, the precursor substance is thermally treated and the metal is thereby precipitated or reduced. A thermal treatment in which the precursor substance releases the metal is typically carried out in air, hydrogen or in an inert gas. The temperatures are in the range of 300-700° C., preferably in the range of 400°-600° C. The treatment periods are within 0.5 to 10 h, preferably within 1 to 3 h.

As a rule, the thermal treatment is preceded by a drying step which is carried out for instance, at 80° C. to 170° C., preferably at 100° C. to 150° C., and for a period of 1 to 48 h, preferably for a period of 12 to 24 h. In the case of aqueous solutions, the volume corresponds to an impregnation solution, preferably of 80% or more, preferably 95-100% of the water absorption capacity of the support material.

In the precursor compounds, the metals are, present in the zerovalent state or as cations. Nitrates, nitrites, chlorides, acetates, acetylacetonates, hydroxyacetates or hydroxides have turned out to be useful as anions or ligands. Phosphates, azides, borates (including fluoroborates pyrazolylborates), sulfonates, substituted carboxylates, such as trifluoroacetates, hydroxycarboxylates, aminocarboxylates, alkoxides, complexes with N-containing ligands, such as amines, N-heterocyclic compounds (for instance pyrrole, aziridine, indoles, piperidine, morpholine, pyridine, imidazole, piperazine, triazoles and their substituted derivatives), aminoalcohols (for instance ethanolamine), amino acids (for instance glycine and others known to the skilled person), amides (for instance formamides, acetamides) and nitriles such as acetonitrile are also possible. Of these, nitrates, formates, acetates, trifluoroacetates, propionates, oxalates and citrates may be considered to be preferred.

Particularly preferred examples of noble metal compounds are palladium tetra ammonium nitrate, palladium oxalate, palladium(II) chloride, palladium(II) nitrate and palladium(II) sulfate, sodium palladium(II) tetrachloride, sodium palladium chloride, ammonium perrhenate, sodium perrhenate, potassium perrhenate rhenium heptoxide, gold (III) chloride, tetrachloroauric(III) acid, silver nitrate, silver nitrite, silver oxides, silver fluoride, silver hydrogen fluoride, silver carbonate, silver oxalate, silver azide, silver tetrafluoroborate, silver acetate, silver propionate, silver butanoate, silver ethylbutanoate, silver pivalate, silver cyclohexanebutanoate, silver ethylhexanoate silver neodecanoate, silver decanoate, silver trifluoroacetate, silver pentafluoropropionate, silver heptafluorobutyrate, silver trichloroacetate, silver 6,6,7,7,8,8,8-heptafluoro-2,2-dimethyl-3,5-octanedionate, silver lactate, silver citrate, silver glycolate, silver gluconate, silver benzoate, silver salicylate, silver phenylacetate, silver nitrophetrylacetate, silver dinitrophenylacetate, silver difluorophenylacetate, silver 2-fluoro-5-nitrobenzoate, silver acetylacetonate, silver hexafluoroacetylacetonate, silver trifluoroacetylacetonate, silver tosylate, silver triflate, silver trispyrazolylborate, silver tris (dimethylpyrazolyl)borate silver ammine complexes, trialkylphosphine and triarylphosphine derivates of silver carboxylates, silver beta-diketonate, silver beta-diketonate olefin complexes and silver cyclopentadienide; gold(III) acetate, gold(III) chloride, tetrachloroauric acid, gold azide, gold isocyanide, gold acetoacetate, imidazole gold ethythexanoate and gold hydroxide acetate isobutyrate; palladium acetate, palladium propionate, palladium ethylhexanoate, palladium neodecanoate, palladium trifluoroacetate, palladium oxalate, palladium nitrate, palladium chloride, tetraammine palladium hydroxides, tetraammine palladium nitrates; ruthenium(III) chloride, ruthenium(III) acetylacetonate, ruthenium(III) acetate, ruthenium carbonyl complexes, ruthenium perchlorate, rhodium(III) chloride, rhenium(III) chloride, rhodium nitrate, ammonium chloroiridate and Ir(III) chloride, Ir(IV) chloride.

In a preferred embodiment the present invention refers to platinum-loaded carbon catalysts. Nitrates, carboxylates, beta-diketonates and also compounds with Pt—C bonds are, for example, suited as precursors for platinum. Of these, divalent platinum(II) complexes are preferred. Also considered to be preferred are: ammonium salts such as ammonium hexachloroplatinate $(NH_4)_2PtCl_6$ and ammonium tetrachloroplatinate $(NH_4)_2PtCl_4$; sodium and potassium salts of halogeno pseudohalogeno or nitrito platinates, such as, for example: sodium hexachloroplatinate $Na_2PtCl_6$, potassium tetrachloroplatinate $K_2PtCl_4$, potassium hexabromoplatinate $K_2Ptbr_6$, potassium tetranitritoplatinates $K_2Pt(NO_2)$; protonated forms such as hexachloroplatinic acid $H_2PtCl_6$, hexabromoplatinic acid $H_2PtBr_6$, hexahydroxoplatinic(IV) acid $H_2Pt(OH)_6$; diammine and tetrammine compounds such as cis- or transplatin dichlorodiammine platinum(II) $Pt(NH_3)_2Cl_2$, tetrammineplatinum dichloride $[Pt(NH_3)_4]Cl_2$, tetraammineplatinum dihydroxide $[Pt(NH_3)_4](OH)_2$, tetraammineplatinum dinitrite $[Pt(NH_3)_4](NO_2)_2$, tetrammineplatinum dinitrate $Pt(NH_3)_4(NO_3)_2$, tetrammineplatinum bicarbonate $[Pt(NH_3)_4](HCO_3)_2$, tetraammineplatinum tetrachloroplatinate $[Pt(NH_3)_4]PtCl_4$; platinum diketonates such as platinum(II) 2,4-pentandionate $Pt(C_5H_7O_2)_2$; $[Pt(CN)_6]^{4+}$, platinum formate, platinum acetate, platinum propionate, platinum carbonate, platinum sulfite, platinum nitrate, platinum perchlorate, platinum benzoate, platinum neodecanoate, platinum oxalate, ammonium hexafluoroplatinate, ammonium tetrachloroplatinate, sodium hexafluoroplatinate potassium hexafluoroplatinate, sodium tetrachloroplatinate, potassium hexabromoplatinate tetraammineplatinum hydroxide, platinum(II) 2,4-pentanedionates, diplatinum trisdibenzylideneacetonate, platinum sulfate and platinum divinyltetramethyldisilaxanes.

If precursor solutions in organic solvents are concerned, for instance Pt carboxylates or mixed carboxylates are possible, for example: Pt-formate, Pt-acetate, Pt-propionate, Pt-benzoates, Pt-octanoate, Pt-stearate, Pt-neodecanoates. Further suitable precursor substances for organic mixtures are aminoorgano platinum compounds such as Pt(diaminopropane)(ethylhexanoate), but also carbonyl compounds.

Suited as organic solvents are for example: saturated paraffinic hydrocarbons with 6 to 12 C atoms per molecule, furthermore, naphthenic hydrocarbons with 6 to 12 C atoms per molecule and also aromatic hydrocarbons with 6 to 11 C atoms per molecule.

Particularly preferred are simple precursor substance solutions, such as $PtCl_4$ in $H_2O$; Pt nitrate solution composed of $H_2Pt(OH)$ and $HNO_3$; $H_2PtCl_6$ in $H_2O$; and $[Pt(NH_3)_4](NO_3)_2$ in $H_2O$ and particularly platinum oxalate.

Platinum oxalate is soluble in aqueous medium. Oxalates are salts of the oxalic acid $(C_2H_2O_4)$. Oxalate derivatives in which an organic residue is arranged between the carboxyl groups are equivalent to oxalates.

Another special advantage of noble metal oxalates is that the noble metal can be precipitated virtually very easily from the solutions thereof and only $CO_2$ and $H_2O$ are otherwise released in this process. This can be carried out already at temperatures of less than 300° C. Moreover, such noble-metal oxalate solutions do not contain any halides that otherwise must be removed after deposition of the metal in a further cleaning step.

Since an Ostwald ripening of the noble metal particles, particularly the Pt particles, does not yet occur at these low temperatures, the deposits on the carbon material can be reduced below 300° C. to noble-metal nanoparticles of a small size. A finely divided dispersion of the noble metal, accompanied with a larger, electrochemically active surface, is thereby achieved.

It is thereby possible during covering with catalytically active substance in method step (e) and a subsequent decomposition treatment to produce noble metal nanoparticles with a mean size between 1-10 nm, preferably less than 8 nm, further preferably less than 5 nm and very particularly preferably between 1-3 nm.

The use of the carbon material covered with noble metal nanoparticles as the electrode material of a fuel cell yields a higher cell voltage also without increased mass loading with noble metal or alloy nanoparticles because the noble metal particles preferably deposit in the region of the numerous crystallite grain boundaries and thereby form a structure resembling a string of beads. A particularly small spacing between the noble metal or alloy nanoparticles is formed within the "string of beads" assembly.

As for the catalyst support with a support composed of porous graphitized carbon material, the above-mentioned object starting from a catalyst support of the above-mentioned type is achieved according to the invention in that the porous graphitized carbon material consists of polycrystalline carbon which has a graphitization degree defined by a basal plane spacing d002 of less than 0.338 nm, and has a hierarchical pore structure with a pore volume of at least 0.5 $cm^3/g$, wherein at least 75% of the pore volume is apportioned to macropores in the size range of 100 to 5,000 nm.

The graphitized, particulate porous carbon material according to the invention is distinguished by a high graphitization degree, defined by a spacing of the hexagonal basal planes d002 of less than 0.338 nm, together with a high porosity, defined by a pore volume of at least 0.5 $cm^3/g$, by a hierarchical structuring of the porosity and by its crystalline structure. The graphitization degree of the carbon material calculated according to the above equation (1) is 69.67% or more. The porous graphitized carbon material consists of polycrystalline carbon, i.e., carbon comprising crystallites. The grain boundaries represent disturbed zones with a higher reactivity by comparison with undisturbed crystal, on which catalytically active substances can preferably accumulate.

The high graphitization degree ensures a high stability of the carbon material, specifically when used as an electrode of a fuel cell on the part of the oxygen reduction reaction. It is accompanied by a small proportion of pores with a diameter of less than 100 nm, which accounts for less than 25% of the total pore volume; of this, a negligibly small volume share of micropores with pore sizes of less than 2 nm.

Despite the high graphitization degree, the porous graphitized particles have a high porosity. The high porosity together with a high share of macropores in the size range of 100-5,000 nm ensures a high absorption capacity of the carbon material for the catalytically active substance and high accessibility.

Due to the hierarchically structured porosity with a high share of macropores, the active surface is accessible for the electrolyte via a continuous macroporous transport system. The accessibility by the electrolyte ensures a good proton transport to the homogeneously dispersed, catalytically active nanoparticles, so that protons and oxygen can be efficiently transported to the catalyst layers and the evolving water can be efficiently discharged.

This hierarchical porosity is e.g., achieved in that the carbon material is produced via a template method in which a template framework is prepared from an inorganic material. The template framework can be produced via a plasma or CVD soot deposition method, as has been explained above with reference to the method according to the invention.

With respect to an electrochemically active surface of the catalytically active substance that is as high as possible, the carbon material preferably has a (BET) specific surface area in the range of 5 m2/g to 200 m2/g despite the high degree of graphitization.

It has turned out to be advantageous when the porous graphitized carbon material is present in the form of particles with a mean particle size of less than 20 μm, preferably less than 10 μm. This small mean particle size turns out to be particularly advantageous for the manufacture of particularly thin catalyst layers.

In this connection it has turned out to be advantageous when the porous graphitized carbon material comprises crystallites with dimensions, determined according to the Scherrer method, of at least 20 nm, preferably of at least 50 nm, and very particularly preferably of at least 70 nm.

The crystallite size is here determined on the basis of an X-ray structural analysis from the measured broadening of X-ray reflections according to the so-called Scherrer equation. Apart from the above-explained basal plane spacing, the crystallite size is a measure of the graphitization degree. Large crystallites are obtained on account of a high graphitization degree.

The crystallites are preferably acicular. The acicular morphology can be observed under the electron microscope. It brings about a high electrical conductivity, a high stability to corrosion, and it contributes to a higher grain boundary proportion by comparison with spherical morphology.

It has turned out to be useful when a noble metal, selected from the platinum group, preferably platinum, or an alloy of the noble metal is provided as the catalytically active substance, and that the noble metal is present in the form of noble metal nanoparticles with a mean size between 1-10 nm, preferably less than 8 nm, further preferably less than 5 nm, and very particularly preferably 1-3 nm.

When the carbon material is used as the electrode of an oxygen/hydrogen fuel cell, exclusively water, but not the corrosively acting hydrogen peroxide (H2O2), is ideally formed in the catalysis of the oxygen reduction reaction. The generation of H2O2 is efficiently suppressed by the use of catalyst metal from the platinum group. The platinum group comprises the following noble metals: Ru, Rh, Pd, Os, Ir and Pt. The catalyst metal is present in a pure unalloyed form or as an alloy among them or with one or plural other metals, particularly with Ti, V, Cr, Mn, Fe, Co, Ni, Cu, Zn, Al, Mo, Se, Sn, W, Nb, Ta, Pb, Bi, Au, Ag, Sc, Y, Pt3Co/Pt3Ni has turned out to be particularly useful as an alloy with platinum.

The smaller the size of the noble metal particles, the larger is the effective, catalytically active surface. In this respect, a catalyst support is preferred in which the noble metal is present in the form of noble metal nanoparticles with a mean size between 1-10 nm, preferably less than 8 nm, further preferably less than 5 nm, and very particularly preferably between 1-3 nm.

An increase in efficiency without increased mass loading with noble metal or alloy nanoparticles is achieved if the noble metal particles have deposited in the area of crystallite grain boundaries.

The noble metal nanoparticles form a structure resembling a string of beads, within which a particularly small distance between the noble-metal nanoparticles or alloy nanoparticles is obtained.

Measuring Methods

Crystallite Size and Basal Plane Spacing

The crystallite size and the basal plane spacing were determined radiographically on the basis of the diffraction line of the (002) plane of the graphitized carbon material. The basal plane spacing was calculated from the position of the (002) reflection via the Bragg equation while the crystallite size of the graphitized carbon was determined with the full width half maximum (FWHM) through the Scherrer equation. This value is obtained in consideration of the device correction by $LaB_6$. The diffractogram was recorded with a commercially available X-ray diffractometer (Stoe, Stadi P-System) in transmission at room temperature. The measurement parameters were set as follows: wavelength: Cu—K alpha 1, $\lambda$=15.4056 nm; measurement range: 14° (2 theta) to 90° (2 theta) (1 Ranges), Omega (fix) 40°; measurement time: 3×600 s); generator: 40 kV 30 mA; monochromator: germanium, detector: IPPSD (Stoe, Darmstadt).

Determination of Platinum Particle Sizes

The mean particle size of the platinum particles was evaluated on the basis of the images of a transmission electron microscope (HRTEM). To this end, the particle sizes of the platinum particles were determined manually on the basis of several images by image editing software and known scaling factor on the assumption of spherical particles.

Pore Volume

The measurement of the pore volume by mercury porosimetry was determined with the following measurement device: ThermoFisher Scientific PASCAL 140 (low pressure up to 4 bar) and PASCAL 440 (high pressure up to 4000 bar).

For the evaluation of the pore volume the following software was used: SOLID Version 1.3.3 (Aug. 2, 2012). Porous glass spheres with a pore diameter of 75 nm were used as reference material.

The pressure is continuously increased, wherein upon detection of an intrusion the controller automatically lowers the pressure build-up speed, the so-called PASCAL mode (standard settings in SOLID for intrusion: 6 and extrusion: 8). Evaluation was carried out according to the Washburn method: density, temperature, surface tension and contact angle of the mercury used for the values for this. The density of the mercury is automatically calculated by the program according to the temperature. As standard, 0.484 N/m is set for the surface tension and 14.11° for the contact angle. The samples were baked at 120° C. for 24 h before measurement. Prior to the filling of the samples the device itself then evacuates the dilatometer for 10 min at an absolute pressure of 0.01 kPa.

(BET) Specific Surface Area

The (BET) specific surface area was measured on the following measuring device: Quantachrome NOVA 3200e. The BET measurement is evaluated according; to the criteria under point 8 of ISO 9277.

Sample preparation and degassing were carried out at 200° C. and at a pressure of <200 mbar for one hour. The method for determining the isotherms was volumetric, discontinuous. Nitrogen with a purity of 4.0 and moisture of 30 ppmv was used as the absorptive. The evaluation was carried out by multipoint determination. Alumina, SARM-13 and SARM-214i of the producer Quantachrome was used as the reference material.

The cell 1 of a PEM fuel cell as schematically shown in FIG. 1 comprises a porous anode 2 washed with hydrogen during operation, and a porous cathode 3 washed with oxygen during operation. An important component of the two electrodes 2, 3 is an active layer 4 and 5, respectively, in which the anodic reaction (layer 4) and the cathodic reaction (layer 5), respectively, take place.

The active layers 4, 5 consist of porous carbon as the support for an electrocatalyst which consists of pure unalloyed platinum in both cases. An electrolyte 6 is provided between the two active layers 4, 5 in the form of a proton-conducting membrane having a thickness of about 50 μm and consisting of sulfonated tetrafluoroethylene polymer (PTFE). The electrolyte 6 ensures proton conduction from the active layer 4 to the active layer 5.

The active layer 5 is fed with hydrogen and the active layer 5 with oxygen. For the homogenization of the gas supply, the active layers 4, 5 are each preceded by a diffusion layer 7 consisting of an electrically conductive carbon cloth, which adjoin plate-shaped current collectors 8.

The active layers 4; 5 consist of porous, graphitized carbon particles that are covered with platinum. The carbon material of the invention that is covered with noble metal nanoparticles is suited for the manufacture of both porous layers 4, 5, but turns out to be particularly well suited for the manufacture of the active layer 5 at the oxygen side. The manufacture thereof on the basis of a template method shall be described hereinafter with reference to an example.

Manufacture of Template Material with Hierarchical Pore Structure

The template material is produced via a standard CVD soot deposition method. A flame hydrolysis burner is here fed with $SiCl_4$ as feedstock material for the formation of $SiO_2$ particles and with oxygen and hydrogen as burner gases. The $SiO_2$ primary particles formed in the burner flame with sizes in the nanometer range agglomerate so as to form more or less spherical aggregates and agglomerates. These "secondary particles" consist of a different number of primary particles and therefore show a broad particle size distribution as a rule. Very small voids and pores in the nanometer range, i.e., so-called mesopores, are present within the secondary particles, between the primary particles, whereas macropores with typical clear widths of about 400 nm to 1,000 nm are formed between the individual secondary particles.

In the course of the soot deposition method, a porous $SiO_2$ blank (so-called $SiO_2$ soot body) is deposited on a deposition surface layer by layer. A mean temperature of about 1,200° C. evolves on the blank surface in the deposition process, so that the $SiO_2$ soot material has a small mean relative density of about 22% (based on the density of quartz glass 2.21 g/cm$^3$).

Due to the small density, the porous soot material can be easily comminuted. This yields non-spherical, platelet-shaped soot particles that, under the microscope, are composed of a multitude of spherical aggregates of $SiO_2$ primary particles that are interconnected via sinter necks, thereby forming a "soot framework" or "template framework." These soot particles are used in the further manufacturing process as template material particles. Due to the manufacturing process they show an anisotropic mass distribution with hierarchical pore structure, as has been explained above.

Impregnating the Template Material with a Carbon Precursor Substance

The soot particles are homogeneously intermixed with finely ground powder of pitch in the volume ratio 1:1 (pitch soot particles) with a mixer. The mixing operation lasts for about 5 min. The particle mixture is subsequently heated to a temperature of 300° C. The low-viscosity pitch penetrates into and infiltrates the pores of the soot particles. The volume ratio of pitch and soot particles is here chosen such that the pitch fills the pores to such an extent that no significant free pore volume remains after infiltration. After an infiltration period of about 30 min the infiltration of the pores is substantially completed. The pores of the $SiO_2$ soot particles are now substantially filled with a viscous pitch mass.

Subsequently, the temperature is slowly raised to 700° C. in nitrogen, and the pitch is reduced (carbonized) to carbon. The original pitch layer thereby shrinks and subsequently forms a thin carbon layer of low microporosity and a thickness of about 50 nm on average.

After cooling, a slightly porous composite mass is obtained from a porous template framework of $SiO_2$ soot particles that is everywhere covered with a layer of graphitized carbon. The $SiO_2$ template framework is subsequently removed in that the composite mass is introduced into a bath of 2-molar NaOH solution.

After the $SiO_2$ mass has been etched away, the material is washed and dried. Flakes of porous carbon are obtained. The volume previously occupied by the $SiO_2$ template framework now forms a coherent pore space consisting of small and large extemplate pores passing through the whole volume of the carbon material.

The intermediate product produced thereby shows a spongy structure with a multitude of coherent pores and cavities of different sizes. The cavities are surrounded by filigree walls, the wall thickness of which does not exceed 500 nm. It is gently broken and comminuted by using an impact mill into a particulate, porous carbon material with particle sizes of less than 20 μm.

For graphitization, the particulate porous carbon material which is free of template material is heated to a graphitization temperature of 2,400° C. Due to the spongy structure of the intermediate product of carbon and due to the stable walls, the pore distribution of the macropores hardly changes during graphitization of the carbon material. Micropores disappear substantially, resulting in a smaller overall pore volume than in the carbonized carbon material. This yields a graphitized particulate porous carbon material which consists of polycrystalline carbon with a high degree of graphitization.

Figure 2:
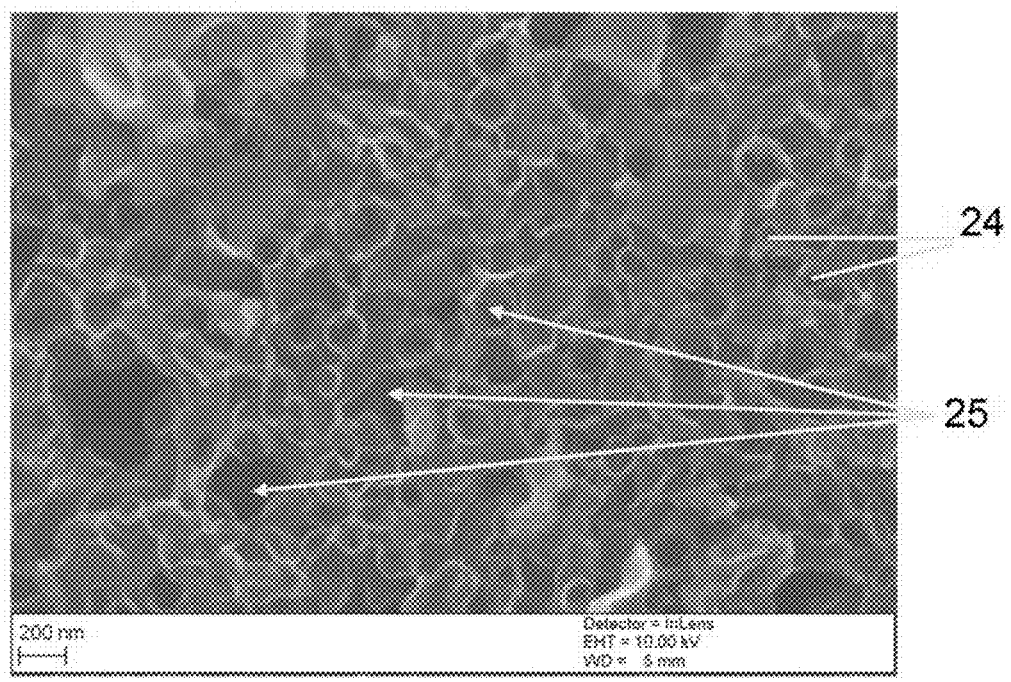
FIG. 2 is a scanning electron micrograph of a graphitized carbon particle with hierarchical porosity.

The SEM image of FIG. 2 shows the structure and pore distribution of such a carbon particle on an enlarged scale.

Visible is the spongy structure in which rather large cavities 25 (micropores) with sizes in the range of 0.1 to 10 μm are surrounded by filigree walls. Multiple smaller cavities or channels 24 are found in addition; micropores cannot be detected. Slightly more than 80% of the volume of the carbon particles is pore space. A measurement of the specific internal surface according to the BET method yields measurement values of about 20 m$^2$/g. The graphitization of the carbon material which has taken place manifests itself in that the edges of the cavities 25 and channels 24 have an edged appearance and are not round, as is the case prior to graphitization.

The spongy structure extends in all spatial directions and approximately represents a negative image of the mass distribution of the original $SiO_2$ template framework. It has a hierarchical pore structure. This structure is inter alia due to the fact that the removed template material has left cavities in the mesopore and macropore range that are three-dimensionally interlinked. The carbon deposit surrounding this linked cavity consists essentially of polycrystalline graphitized carbon of low porosity.

It is important that the individual cavities are not closed, but fluidically connected to other mesopores and macropores, so that catalytically active substance fixed in or onto the spongy structure is accessible for electrolytes, and water or other reaction products can be discharged efficiently.

Figure 3:
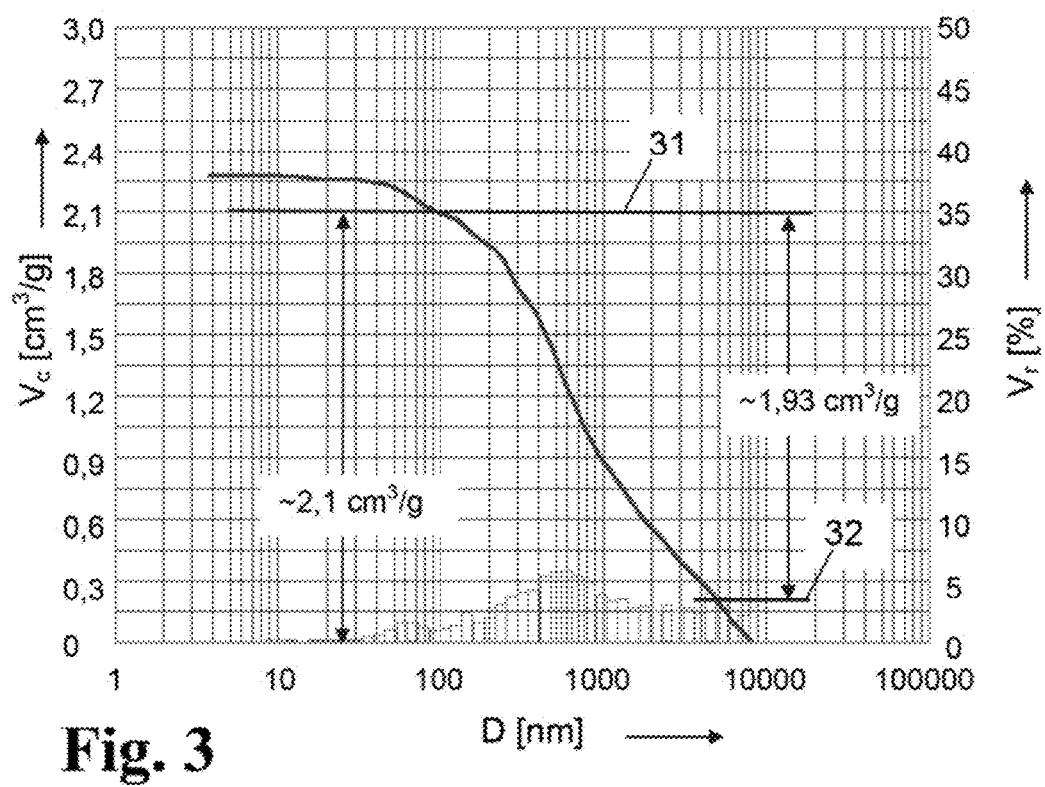
FIG. 3 is a diagram on the pore size distribution of the porous carbon material.

The diagram of FIG. 3 shows the pore size distribution of the graphitized porous carbon material. The cumulative pore volume $V_c$ [in cm$^3$] is plotted on the left ordinate, and the relative pore volume $V_r$ in [%] is plotted on the right ordinate against the pore diameter D in [nm]. It can be seen that a first maximum of the pore size distribution is in the mesopore range of about 50 to 60 nm and a second maximum of the pore size distribution in the macropore range at pore sizes of 500-600 nm. There are also a number of larger pores with pore diameters of up to about 10,000 nm. Macropores in the size order 100 to 10,000 nm yield a total pore volume of about 2.1 cm$^3$/g (difference of the cumulative pore volume between the zero line and line 31), wherein, however, the greatest part of the pore volume accounts for micropores in the size order 100-5,000 nm, which yield a total pore volume of about 1.93 cm$^3$/g (difference of the cumulative pore volume between lines 31 and 32), i.e., about 92% of the total pore volume of about 2.27 cm$^3$/g. The illustrated measurement results were obtained by a mercury porosimeter measurement.

Figure 8:
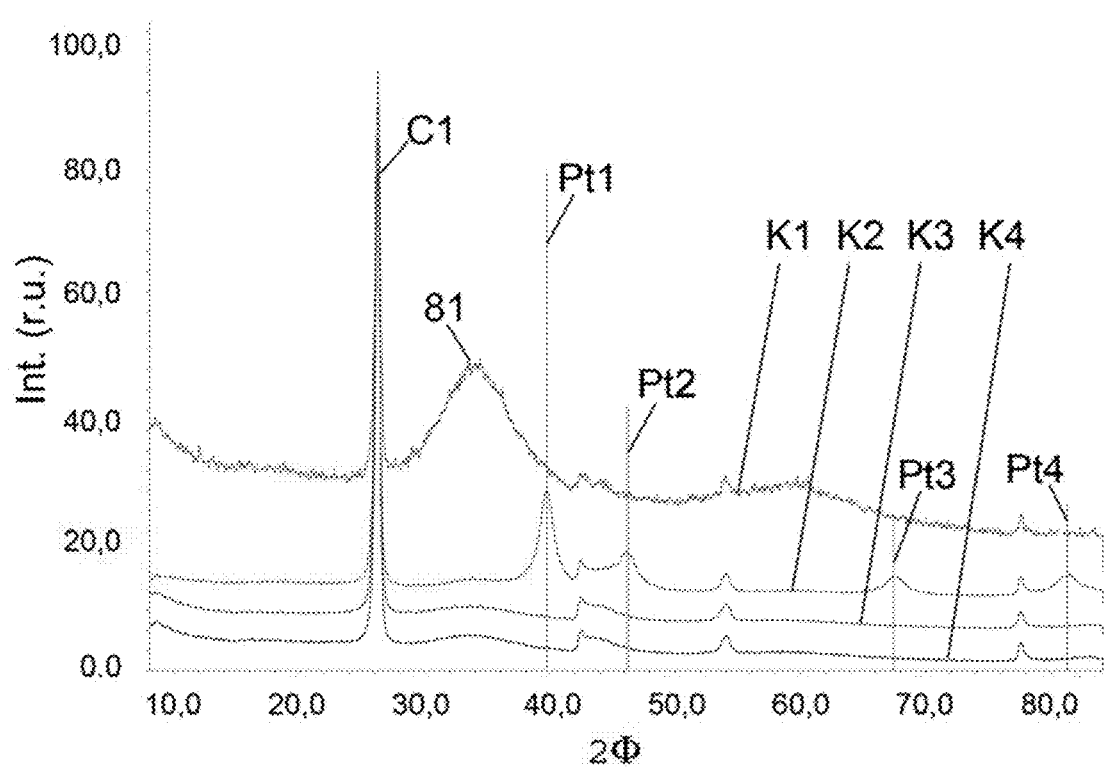
FIG. 8 shows XRD detail spectra of plural platinum-covered catalyst supports according to the invention.

The high graphitization degree of the spongy structure manifests itself in that the spacing 002 of the (002) basal planes with hexagonal crystal structure is less than 0.338 nm. This spacing is determined radiographically on the basis of the diffraction line of the (002) plane of the graphitized carbon material, as shown in FIG. 8.

Figure 4A:
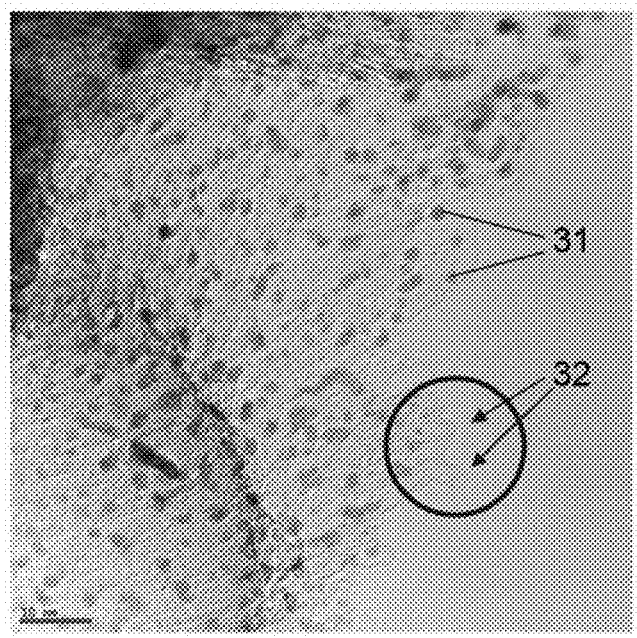
FIG. 4a is a TEM image of a carbon particle covered with platinum particles after graphitization.

A high degree of graphitization contributes to high corrosion resistance of the carbon material. This effect is even intensified in that the ends of the basal planes of the graphite-like layer structure are partly closed, similar to glassy carbon. This is shown by way of example in the TEM image of FIG. 4a of a carbon particle covered with platinum particles 31 after graphitization on an extremely magnified scale. The platinum particles are discernible in the dark-gray coloration. They are distributed relatively uniformly and have mean sizes of about 2 nm.

A basal plane of the carbon particle is visible as a slightly structured, translucent area. The base plane edge (marked with a circle) seems to be bent over in the form of a U, so that its free end 32 retracts towards the graphite layer. The basal-plane ends are thereby closed.

Figure 4B:
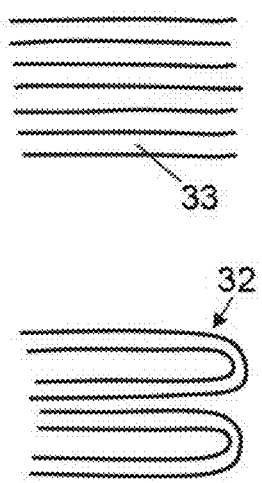
FIG. 4b shows schematic sketches for explaining the appearance of the basal-plane edge of the carbon particle of FIG. 4a, FIG. 5 shows voltammograms of a conventional, platinum-covered carbon electrode for comparison with cyclic voltammograms of a carbon electrode according to the invention.

FIG. 4b shows the bending and closing of the basal-plane ends 32 by a sketch, as compared with the edge profile of basal-plane ends 33 in a common graphitic structure.

The grain boundaries of the polycrystalline graphitized carbon material form disturbed zones that by comparison with undisturbed crystal are reactive. For a more extensive activation the graphitized particulate porous carbon material is subjected to a 2-hour activation treatment in air at a temperature of about 450° C. The graphitized carbon material is thereby structure-selectively activated, resulting in reactive surface groups predominantly on the crystallite grain boundaries, with catalyst or catalyst precursors being preferably anchored to and enriched on said groups.

Covering the Graphitized Carbon Material with Noble-Metal Nanoparticles

The carbon material is covered by using platinum oxalate (Pt oxalate).

Preparation of Platinum Oxalate

Pt oxalate is prepared by reacting $H_2[Pt(OH)_6]$ with oxalic acid in water. 54.29 g deionized water and 18.01 g $H_2[Pt(OH)_6]$ (10.0 g Pt; 50 mmol) were added in a 250 ml three-necked flask with 0.04 Pt oxalate solution (Pt 0.24 mmol) as starter under stirring (250 rpm) at room temperature. Starting from 23° C. in a water bath, the suspension was heated up to 40° C. within 20 minutes. The suspension was kept at this temperature for five hours and an amount of 2.568 g oxalic acid dihydrate was added every hour under continuous stirring. After cooling under stirring to 20° C., the suspension was filtered over a 0.2 μm membrane filter. Filtration was carried out within 30 minutes and showed a filter residue of 0.5 g. 74.49 g Pt oxalate solution with a Pt content of 13.40% was obtained, corresponding to a Pt yield of 99.82%.

Fixation of Platinum Oxalate to the Carbon Support Material

In a container, 50 g of the graphitized and activated carbon particles are mixed under continuous mixing dropwise with 42.37 g of a platinum oxalate solution with a platinum content of 10.12%. The solution amount of the Pt-containing solution is here experimentally given such that it corresponds to the specific pore volume of the material according to the so-called "incipient wetness method," which means that the given pore volume is fully filled with the solution.

To ensure a homogeneous distribution of the solution, the carbon material which is impregnated with Pt solution is thoroughly kneaded during and after complete addition of the solution until a uniformly moist and pourable mass is obtained without lumps.

The moist carbon material which is impregnated with Pt solution is subsequently dried or calcined in a furnace in two temperature stages at 150° C. and 235° C. for a total period of 2.5 h in inert gas ($N_2$). The nitrogen atmosphere has a sufficiently reducing effect to decompose Pt oxalate into metallic platinum. Since no Ostwald ripening of the Pt particles occurs, this yields a finely divided dispersion of the platinum with Pt nanoparticles with a mean size of 2 nm.

The large active surface produced due to the preceding activation of the surface of the carbon material contributes to an agglomerate-free distribution and firm fixation of the Pt nanoparticies on the carbon material. Enrichment with Pt nanoparticles manifests itself in the area of the edges and corners of the nanoparticles and on crystallite grain boundaries. Juxtapositions of the Pt nanoparticles similar to a string of beads are there formed with a very small spacing among them.

Figure 7:
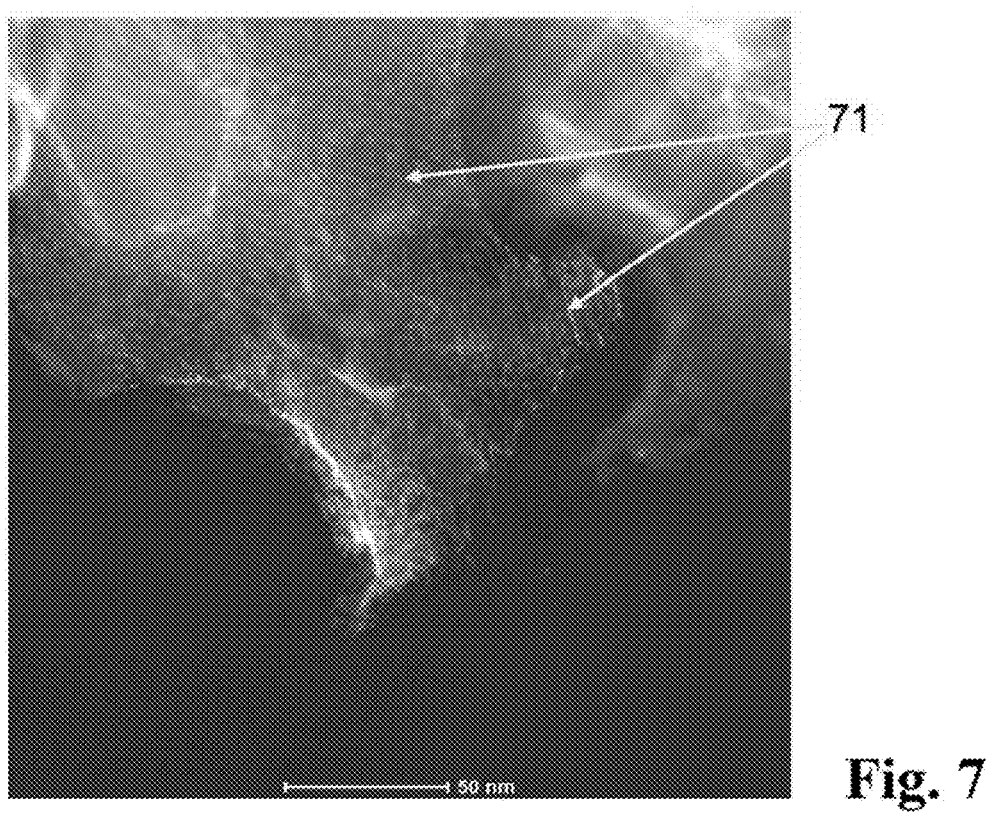
FIG. 7 is a TEM image of the Pt covering and of the crystal structure of the carbon material.

The TEM image of FIG. 7 shows a carbon particle covered with platinum particles. The platinum particles appear as bright dots. Thread-like structures 71 are visible (so-called "bead structures"). These are formed by a fine, narrow juxtaposition of platinum particles along activated surface structures, such as grain boundaries.

Measurement Results

Cyclovoltammetric measurements by means of rotating disk electrodes throw light on the electrochemical behavior of catalyst supports. A rising and then a sloping potential is applied to the work electrode (=measurement electrode) in an electrolyte and the current intensity is recorded in response thereto. The potential of the work electrode is determined against a reference electrode.

The electroactive substance is oxidized or reduced at a typical potential, which manifests itself in current values of maximum amounts. If several current maxima occur in one cycle, this may indicate that the substance is oxidized or reduced over several stages. The accompanying voltage values correspond to the oxidation and reduction potentials at the anode side and cathode side, respectively. However, a charge may also be transferred from the surfaces and to the surfaces of the catalyst support material.

The change rate of the potential, the potential sampling rate, has an impact on the measurement results. For instance, at high potential sampling rates, limitations in the ion transport in the electrolyte or in the electrode structure may be noticed earlier than at low sampling rates.

Thus, voltammograms are current/voltage curves, wherein the measured current (in A) is plotted on the ordinate against the applied voltage (in V).

Figure 5:
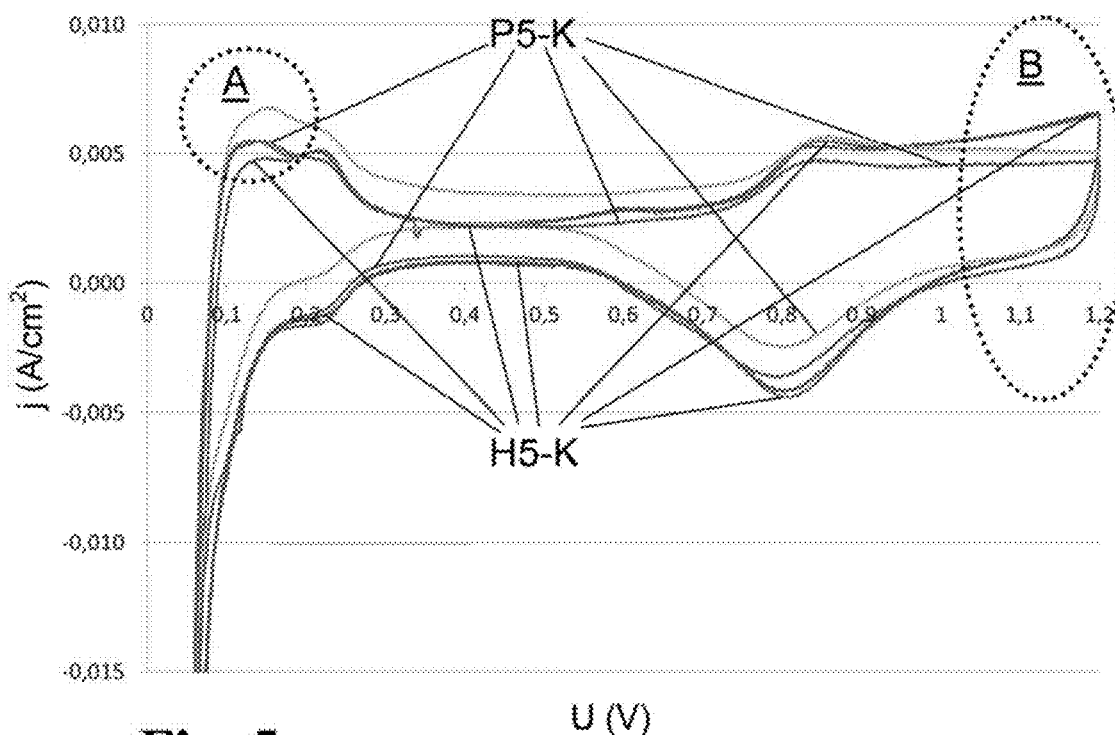

In the diagram of FIG. 5, cyclovoltammograms of a commercial electrode of a porous carbon material as a support for platinum (company Johnson Matthey; trade name "HiSpec"; hereinafter called "standard") are drawn by comparison with cyclovoltammograms, measured on porous carbon material as the support for platinum according to the present invention, namely each time when used as anode and as cathode. For better clarity the curves of the two cathodic voltammograms for the catalyst support P5-K of the invention and for the standard material H5-K are specifically marked in FIG. 5. The platinum covering is here as follows:

P5-K:standard cathode: 120 $cm^2Pt/cm^2$=0.040 $m^2Pt/mgPt$
H5-K:cathode acc. to inv.: 122 $cm^2Pt/cm^2$=0.041 $m^2Pt/mgPt$ The voltammograms are each measured in the potential range between 0.0 and 1.2 V of applied voltage on the work electrode against the standard hydrogen electrode (SHE) at a sampling rate of 50 mV/s; the current density j (in $A/cm^2$) is plotted on the ordinate against the voltage U (in V).

The current density/voltage curves show typical areas A, B, C and D that reflect the electrochemical behavior of the electrodes at the various reversal potentials and shall be explained in more detail hereinafter.

For instance, the current rise in area A is due to a loading of the Pt particles with hydrogen. The surface integral is a qualitative measure of the available active Pt surface.

The current rise in area B is due to corrosion of the carbon support material. This is more pronounced the higher the reversal potential. At the maximum value of the reversal potential of 1.2 V, a pronounced decay of the support material already takes place in the case of the standard electrode H5-K. In the electrode material P5-K of the invention, a current rise is not yet visible at this reversal potential. Moreover, it has been found that the decomposition in the electrode material according to the invention only occurs at a reversal potential of 1.45 V to about 1.50 V. The electrode material according to the invention thereby allows an overvoltage higher by about 0.25 V without a noticeable decomposition, which is due to the higher corrosion resistance of the graphitized support material.

Figure 6:
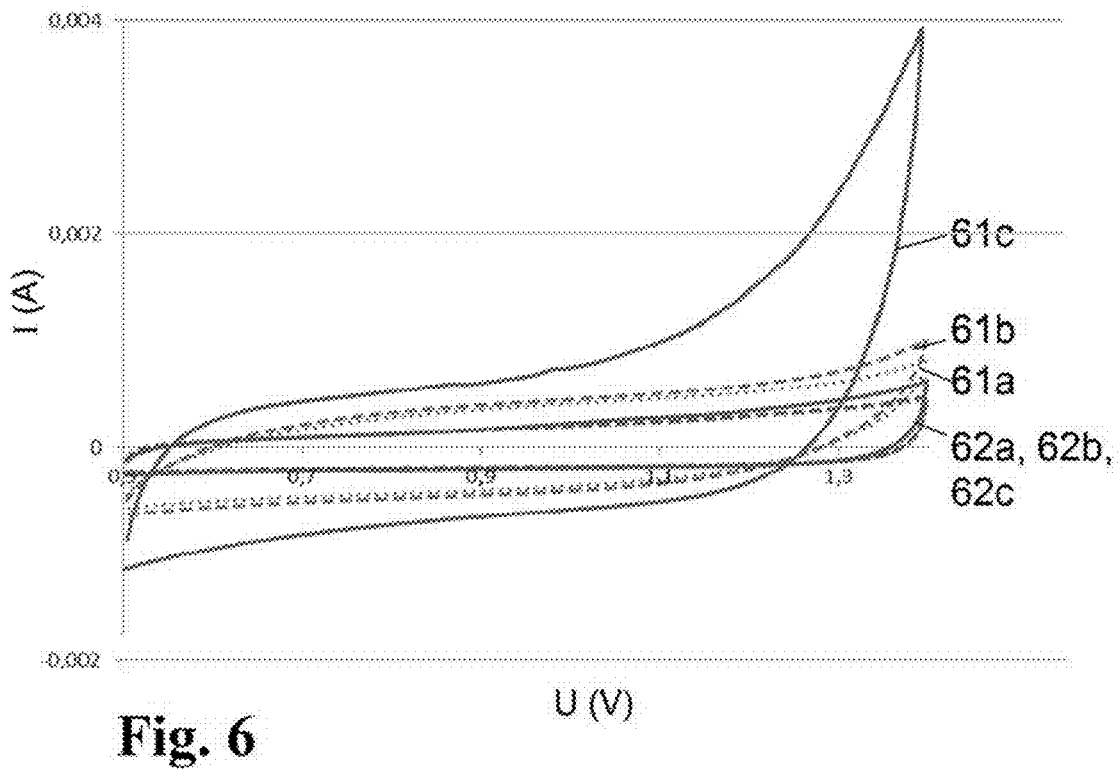
FIG. 6 shows cyclic voltammograms of the conventional carbon electrode without platinum covering and the development with the cycle number for comparison with the carbon material according to the invention without platinum covering.

FIG. 6 shows the development of the charge conversion with the cycle number for the area B (of the carbon support decomposition). Plotted are cyclovoltammograms of the conventional carbon support material, which has also been used in the measurement of FIG. 5 (but without noble metal covering) as compared with the catalyst support material according to the invention (also without noble metal covering). Measurement was carried out at a sampling rate of 100 mV/s in the potential range between 0.0 and 1.8 V of applied voltage. A platinum wire is used as the counter electrode, Ag/AgCl serves as the reference electrode; the electrolyte is 2M sulfuric acid.

The voltammograms marked with 61 were measured on the standard material; the voltammograms marked with reference numeral 62 are assigned to the carbon support material of the electrode according to the invention. Three measurements were respectively taken; these are marked with a, b and c in FIG. 6. The measurements differ in their respective cycle numbers as follows:

"a"=2 cycles
"b"=25 cycles
"c"=50 cycles

It is evident from this that in conventional carbon support material between the $2^{nd}$ cycle (curve 61a) and the $50^{th}$ cycle (curve 61c) a dramatic deterioration occurs especially in the area designated at the top with B i.e., the area of the oxidative decomposition of the carbon support material. In contrast, the voltammograms 62a, 62b and 62c of the carbon material according to the invention do almost not differ and virtually come to lie one above the other in FIG. 6.

The slight change in the carbon material according to the invention is due to the high graphitization degree and the closing of the (002) basal planes.

A hint at this high graphitization degree is also given by the X-ray diffractometric analysis (XRD measurement) of the carbon material according to the invention with different platinum coverings of FIG. 8. The relative intensity (in relative units) is here plotted against the diffraction angle range 2 theta. Four samples with the same carbon support were however analyzed in a different way for the formation of the platinum covering, namely:

K1 by means of platinum oxalate, 40.32 wt. % Pt.
K2 by means of platinum ethylamine, 10.13 wt. % Pt.
K3 by means of platinum oxalate, 8.96 oxalate, 8.96 wt. % Pt.
K4 by means of platinum oxalate, 9.03 wt. % Pt.

The weight percentage refers each time to the total weight of the catalyst support.

The diffraction line of the (002) graphite plane at an angle of about 26.3° is marked with C1, it is similar in all samples. The graphitization degree can be read from its position relative to the corresponding diffraction line in highly ordered 2H graphite. This is marked by a basal plane spacing of less than 338 pm. The width of the diffraction line C1 is a measure of the crystallite size. The smaller the width, the greater is the mean crystallite size.

The typical diffraction lines for platinum crystals are designated with Pt1, Pt2, Pt3 and Pt4. It is visible that only sample K2 has diffraction maxima at these typical diffraction lines, but not samples K1, K3 and K4. This is proof that the platinum crystals are radiographically amorphous in the catalyst supports covered by using platinum oxalate, i.e., particle sizes in the range of 1 to 3 nm. By comparison, in sample K2 in which the platinum covering process was carried out using platinum ethylamine, the platinum crystals obtained are so large that they show the typical diffraction lines for platinum crystals.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a porous graphitized carbon material covered with metal nanoparticles, particularly for electrochemical applications, comprising the following method steps:

(a) providing a porous template framework composed of inorganic template material,
(b) infiltrating the porous template framework with a carbon precursor,
(c) thermally treating the carbon precursor, comprising carbonizing the carbon precursor at a carbonization temperature,
(d) removing the template framework to form a particulate porous carbon material,
(e) graphitizing the particulate porous carbon material at a graphitization temperature higher than the carbonization temperature to form a graphitized, particulate, porous carbon material,
  wherein the graphitized carbon material has a hierarchical pore structure with a pore volume of at least 0.5 cm$^3$/g, wherein at least 75% of the pore volume is apportioned to macropores in the size range of 100 to 5000 nm, and the porous graphitized carbon material consists of polycrystalline carbon which has a graphitization degree defined by a basal plane spacing d002 of less than 0.338 nm,
(f) subjecting the graphitized carbon material to an activation treatment in an atmosphere having an oxidizing effect, and
(g) covering the graphitized particulate porous carbon material with a catalytically active substance, comprising using a noble metal selected from the platinum group of the Periodic Table or an alloy of the noble metal as the catalytically active substance and applying a solution of a noble metal compound to the graphitized porous carbon material and subjecting it to a decomposition treatment to form a deposit of catalytically active particles on the graphitized porous carbon material.

2. The method according to claim 1, wherein providing the template framework in method step (a) comprises producing porous particles composed of the inorganic template material from a starting material by flame hydrolysis or pyrolysis and depositing the particles from a gas phase to form the template framework.

3. The method according to claim 1, wherein the graphitization temperature is in the range of 1,400-2,500° C.

4. The method according to claim 1, wherein the activation treatment of the graphitized carbon material is carried out in an oxygen-containing atmosphere at an elevated temperature between 400° C. and 500° C.

5. The method according to claim 1, wherein the porous carbon material obtained after removal of the template framework in method step (d) has a (BET) specific surface area in the range of 20 m$^2$/g to 500 m$^2$/g.

6. The method according to claim 1, wherein a particulate porous carbon material with a particle size of less than 20 μm is graphitized, and wherein for setting the particle size the porous carbon material is comminuted before or after removal of the template framework.

7. The method according to claim 1, wherein the decomposition treatment is carried out at a temperature of less than 300° C.

8. The method according to claim 1, wherein during method step (g), noble metal nanoparticles with a mean size between 1-10 nm are produced.

9. A catalyst support containing an electrically conductive support of porous graphitized carbon material coated with a catalytically active substance, wherein the porous graphitized carbon material consists of polycrystalline carbon which has a graphitization degree defined by a basal plane spacing d002 of less than 0.338 nm and a hierarchical pore structure with a pore volume of at least 0.5 cm$^3$/g, wherein at least 75% of the pore volume is apportioned to macropores in the size range of 100 to 5,000 nm.

10. The catalyst support according to claim 9, wherein the porous graphitized carbon material has a (BET) specific surface area in the range of 5 m$^2$/g to 200 m$^2$/g.

11. The catalyst support according to claim 9, wherein the porous graphitized carbon material is present in the form of particles with a mean particle size of less than 20 μm.

12. The catalyst support according to claim 9, wherein the porous graphitized carbon material comprises crystallites with dimensions determined according to the Scherrer method of at least 20 nm.

13. The catalyst support according to claim 9, wherein a noble metal selected from the platinum group of the Periodic Table or an alloy of the noble metal is provided as the catalytically active substance, wherein the noble metal is present in the form of noble metal nanoparticles with a mean size between 1-10 nm.

14. The catalyst support according to claim 9, wherein the noble metal particles are deposited in a region of crystallite grain boundaries.

* * * * *